Aug. 11, 1959     F. HOFBAUER     2,898,612
COMBINED DRILL AND TAP HAVING DRILL LANDS
EXTENDING THROUGHOUT THE LENGTH
OF THE TAPPING PORTION
Filed May 10, 1954     2 Sheets-Sheet 1
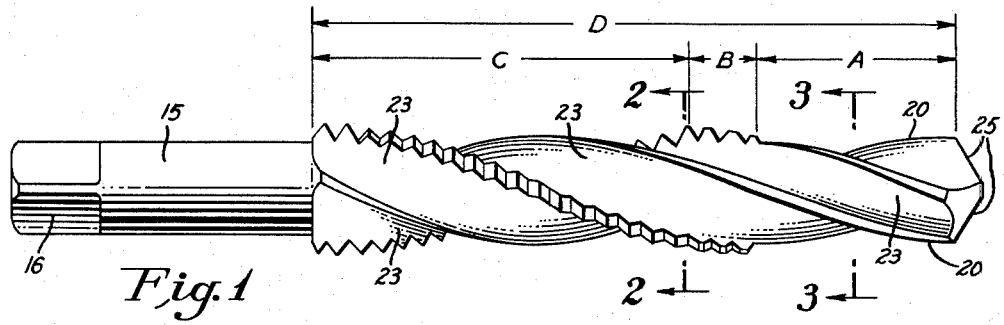
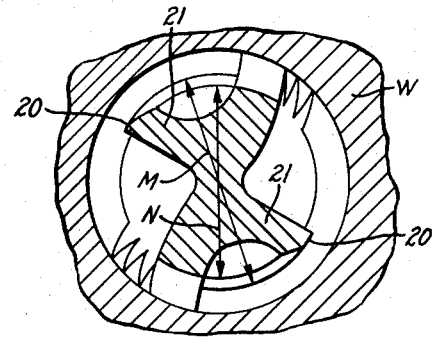
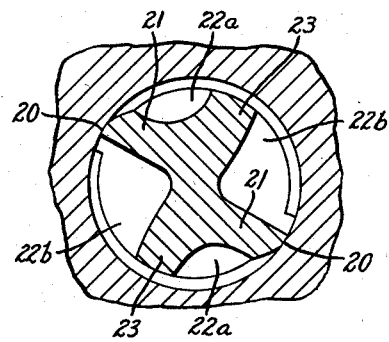
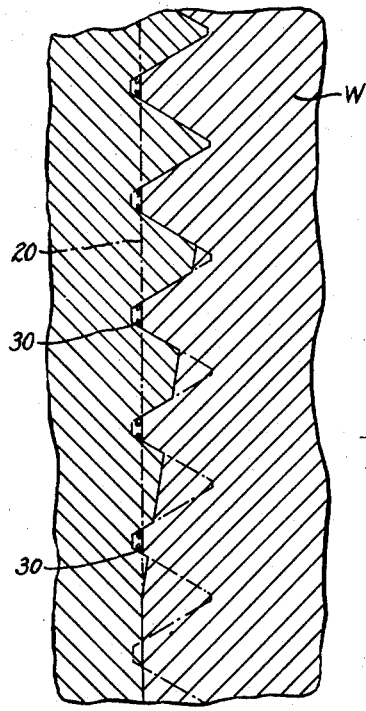
INVENTOR.
FRANK HOFBAUER
BY
*Gregory S. Dolgorukof*
ATTORNEY.

Aug. 11, 1959

F. HOFBAUER 2,898,612

COMBINED DRILL AND TAP HAVING DRILL LANDS
EXTENDING THROUGHOUT THE LENGTH
OF THE TAPPING PORTION

Filed May 10, 1954

INVENTOR.
FRANK HOFBAUER

BY
Gregory S. Dolgorukof
ATTORNEY.

2,898,612

COMBINED DRILL AND TAP HAVING DRILL LANDS EXTENDING THROUGHOUT THE LENGTH OF THE TAPPING PORTION

Frank Hofbauer, Montpelier, Ohio

Application May 10, 1954, Serial No. 428,436

3 Claims. (Cl. 10—140)

This invention relates to rotary cutting tools and more particularly to tools which are fed in cutting in the axial or end direction, such for instance as drills, reamers, taps, countersinks, counterbores and the like. The present application is a continuation-in-part of my co-pending application Serial No. 145,728, filed on February 23, 1950 for Combined Drill and Tap, now abandoned.

Progress in cutting tools of this general nature is aimed primarily in two directions: first, to producing work of greater precision and, second, to performing the work more speedily and economically. The cost of the work produced with cutting tools of this nature depends, in turn, on several factors, particularly on the time required, cost of making the tools and maintaining them in proper cutting condition, and on the length of their useful life. Great progress has been made in this field. Nevertheless, there is still much to be desired in finished work done with such tools, both as to its precision and as to its cost.

I have found that precision of work produced with the tools of this nature is greatly affected by certain inadequacies in design of such tools, in consequence whereof various portions or elements of machining operations cannot be done to their geometric or dimensional specifications. For instance, internal cylindrical surfaces such as cylindrical walls of holes and bores, as well as various shoulders therein are misplaced radially, which is to say, offset from their theoretically predetermined axis, are not truly cylindrical or do not extend along a straight axis. I have found that such difficulties result from a number of causes and particularly from undesirable side pressure which may be exerted by a tool either because of its construction or due to the manner in which it is held in the chuck of the machine, or because of the machine not running true. Often such side pressure results from improper holding of the work in the fixture.

I have also found that lack of precision in the finished work is sometimes observed even with expensive machines and cutting tools not likely to have the difficulties explained above. I have discovered that in such cases the lack of precision is often due to a large extent to the formation of minute burrs on the finished work particularly on the cut edges thereof, because of the cutting edge of the tool pushing up the material at such edges as it cuts. An example of such burrs may be found in internal and external screw threads. A V-type screw thread is usually designed to have a trapezoidal cross section or, in other words, to have flats at the pointed ends of the V's. Internal screw thread of such a nature is sometimes referred to as three-quarter thread, indicating that the flats on the V's are formed at one-quarter of the height of the inverted V. The flats in internal screw threads are the original cylindrical surfaces of the wall of the drilled hole. Examination of sections of threaded holes under a microscope reveals that such flats are not portions of true cylindrical surfaces but are surfaces distorted by the burrs produced by the tapping tool, with the burrs projecting inwardly and decreasing the diameter of the hole. A similar situation exists also with respect to external threads. Such burrs do not always align themselves to extend into the clearance space between internal or external thread and interfere with the operation of the thread, making it tighter and yet not fitted properly.

Increase in cost of machining operations is often caused by the necessity to use several tools one after another operating on the same hole or bore and fed along the same axis. For instance, in producing a tapped hole, the hole is usually first drilled with one or two drills; thereupon it may be reamed with the use of a separate reamer, and after reaming be tapped with a separate tapping tool. Use of such tools requires either changing tools in the machine or passing the work from one machine to another. For producing work of precision it is important that each of such separate tools is rotated around the same axis with respect to the work and is fed straight along such axis. For many years those skilled in the art attempted to produce combined tools which could perform several operations one after another on a piece of work without changing the tools or moving the work from one machine to another. However, most of such tools are, in effect, an assemblage or aggregation of several of tools put end to end on a common axis, such for instance as a tool having its working end in the form of a drill, followed by a reamer portion, and thereupon followed by a tapping portion. I have found such tools to be wholly inadequate for the purposes intended. Particularly, I observed that such tools do not produce work of a greater precision than each separate tool. Moreover, since in many instances such tools can be ground only once, their practical application proved prohibitively costly.

One of the objects of the present invention is to provide an improved tool of the above general nature and a method of making the same, whereby the above difficulties and disadvantages are overcome and largely eliminated.

Another object of the present invention is to provide an improved combined drill and tap which is so constructed that the threading edges thereof may be sharpened without affecting the lands of the drill, and in which both the drill edges and the threading edges may be sharpened many times virtually until the entire body portion of the tool is thus consumed by grinding.

A still further object of the present invention is to provide an improved combined drill and tap in which means are provided whereby the hole of the proper diameter for the thread is first drilled, whereupon threading edges begin engaging the surfaces of the drilled hole for cutting threads thereon, while the drill lands continue to remain in sliding engagement with the walls of the hole or cylindrical portions thereof and thus guide the threading edges of the tool and prevent eccentric cutting of the thread.

A still further object of the present invention is to provide an improved drill and tap having means whereby the inwardly directed burrs produced by the thread cutting edges of the tool are removed immediately after their formation, and whereby the finished thread having flats at tops of the inverted V-shaped threads is completely cleared of burrs and has its predetermined geometric cross section.

A still further object of the present invention is to provide an improved tap or a combined drill and tap in which the burr-cleaning means also operate as guiding means and prevent side cutting and eccentricity even when the tool, because of its improper running in the machine, exerts side pressure on the work, or where the work exerts side pressure on the tool.

A further object of the present invention is to provide an improved method of making a combined tool of the foregoing nature and providing for cylindrical grinding of the drill lands extending between the threading edges of the tapping portion of the tool.

Further objects and advantages of this invention will be apparent from the following description and appended claims, reference being had to the accompanying drawings forming a part of this specification wherein like reference characters designate corresponding parts of the several views.

Fig. 1 is a side view of a combined drill and tap embodying the present invention.

Fig. 2 is a sectional view taken in the direction of the arrows on the section plane passing through the line 2—2 of Fig. 1, the tool being shown applied to the work.

Fig. 3 is a sectional view taken in the direction of the arrows on the section plane passing through the line 3—3 of Fig. 1, the tool being shown applied to the work.

Fig. 4 is an end view taken on the right-hand or drill end of the tool of Fig. 1.

Fig. 5 is a fragmentary sectional view illustrating the operation of drill lands in clearing the burrs as they are produced by the thread cutting edges of the tool.

Figure 6:
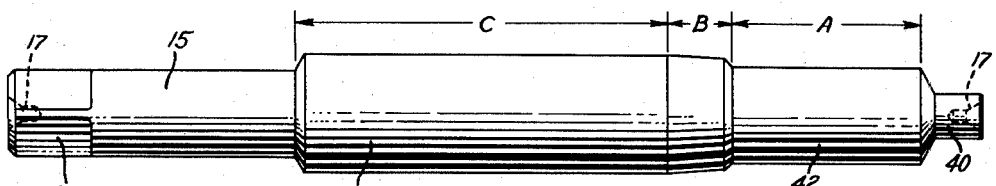
Fig. 6 shows a turned blank for making the tool of Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the invention I discard the former practice of providing a tool of this general nature by arranging a drill and tap end to end along the same axis and thus, in effect, having a drill adapted to drill a hole whereupon the tap enters and taps the hole without any further cooperation from the drill. In accordance with the present invention I provide a tool constituting, in effect, a drill having its lands extending throughout the entire length of the working portion of the tool, with threading edges being provided between the drill lands. The drill lands are so arranged that the tops of the threads extend radially beyond the drill lands while their inner or root diameter extend below the drill lands. By virtue of such an expedient two exceedingly important advantages are attained. The first advantage resides in the fact that the cylindrical surfaces of the drill lands continue to bear on the walls of the hole in the process of cutting the thread, preventing the tap from cutting more on one side than on the other. Thus, perfect concentricity of the thread is ensured by the guiding action of the drill lands, which concentricity is not ensured in tools where the drill lands terminate where the tap begins.

(It should be understood that since the usual practice in tapping holes is to provide what is known as a partial thread such as three-quarter thread, with the flats at the root diameter of the internal thread in the work constituting, in effect, the remaining portions of the drilled hole, even when the thread is fully cut, there is enough cylindrical surface left to provide for proper engagement thereof with the cylindrical surface of the drill lands.) Another exceedingly important advantage of my improved tool resides in the fact that the cutting edges of the tap are immediately followed in their cutting actions by the edges of the drill lands, which extend substantially beyond the roots of the thread recesses on the tool. While these edges are not capable and are not intended to cut sidewise, i.e., to operate as side milling cutters, such edges are exceedingly effective to deburr the thread as it is being formed, thereby ensuring geometrically correct threads without any burrs pushed either inwardly of the tap hole or into thread recesses thereof.

It should be appreciated clearly that unless the drill lands extend substantially beyond the roots of the thread recesses on the tool no desired action is attained. In cases where the drill lands extend only to the roots of such recesses, they are useless if a "full" thread is cut with tap edges leaving no burrs, and cannot reach the burrs if a "three-quarter" or other partial thread is cut as is the usual practice.

It should also be appreciated in this connection that "cleaning" a tapped hole with a separate tool does not necessarily produce the action described above since such tool may merely push the burrs into the thread recesses where they will interfere with proper engagement of the external thread entering such recess. On the other hand, if after such "cleaning" of the hole an attempt is made to clear the recesses by retapping the hole, some of such burrs may be again pushed toward the center of the hole, that is out of the thread recess, requiring repeated "cleaning" of the hole. In other words, with the use of a cleaning tool and a tap for cleaning the tapped hole, the same would have to be used repeatedly, if perfect results are required. In my improved tool a precision and perfect action is attained with one operation, thus greatly increasing precision and decreasing the cost of the operation.

In the drawings there is shown, by way of example, a number of tools embodying the present invention, and a preferred method of making the same in accordance with the invention. Referring specifically to Figs. 1-5, the tool illustrated therein is a combined drill, tap, and cleaning tool and it comprises a working portion, generally designated by the letter D, and a shank 15 which may be provided with square end such as 16 or have other means enabling the tool to be held in a chuck either through frictional or a positive engagement therewith.

The working portion of the tool comprises a drill having a diameter M, see Fig. 2, and having its two lands 20 extending throughout the entire length, or substantially the entire length, of the portion D is important for proper understanding of the present invention, and this fact should be thoroughly appreciated at this point. Formation of the ridges, generally indicated by the numeral 21, on which the drill lands 20 are formed is effected by the provision of four parallel flutes 22a and 22b. Provision of two flutes between the adjacent drill lands (instead of only one) results in ridges 23 being formed between the flutes 22a and 22b, respectively. By virtue of such a construction there is provided between the two drill lands 20 two ridges 23 extending throughout the entire portion D of the tool. However, while the drill lands 20 have a uniform cross section throughout the entire respective lengths, the cross section of the ridges 23 vary from the drill end of the tool to the shank 15, as explained below.

Figure 10:
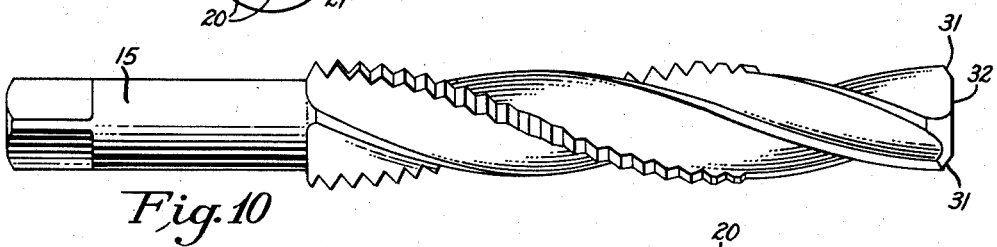
Fig. 10 is a modified form of the combined drill and tap embodying the present invention, the tool including a drill of the core type.

In the construction of Figs. 1–4, the drill is provided with a drill end having drilling edges 25 formed in a manner well known in the art and designed to originate a hole. It will be understood, however, that this end may be differently formed, if desired, to provide a different type of drill end such as shown in Fig. 10 wherein the end is of the type known as core drill end.

The ridges 23 vary in their cross section, as mentioned above. From the drill end for a predetermined distance, which is determined in part by the thickness of the intended work on the depth of the hole to be drilled, said ridges are relieved for a sufficient distance to have a diameter substantially smaller than the diameter M of the drill. This portion of the ridges 23 is designated in Fig. 1 by the arrow indicating distance A. Within the portions of the ridge designated by the arrow indicating distances B and C, the ridge 23 is provided with threading or tapping edges. However, while within the distance designated as C, said tapping edges have full threads, within the distance designated by the letter B each of the tapping edges is relieved to truncate the inverted V-shaped thread, in varying degree starting from zero to full thread in order to provide thread cutting edges for gradual engagement with the work.

For appreciating the operation of the tool embodying the present invention it should be clearly kept in mind that the tapping edges cut the thread only with their portion B, while operation of the threading edges in the portion C is merely to clean the thread in cooperation with the drill lands 20 extending between them. In addition, provision of the full thread edges in the portion C is intended to permit sharpening or regrinding of the threading edges. As the threading edges are reground the portion B gradually moves toward the shank 15 of the tool decreasing the length of the portion C until all full thread edges thereof are thus consumed. Thus, my improved tool may be reground many times, and may have useful life measured in years. In addition, after the portion C is fully consumed, the tool may still be used for a long time as a plain drill by grinding off the few threads left on the ridges 23.

The diameter of the thread provided on the ridges 23 is selected to provide a desired thread but in proper relation to the diameter of the drill lands 20, in order that the drilled hole and the screw thread provided therein be of the desired dimensional characteristic and relationship to each other.

It is an important feature of the present invention that the roots of the thread cutting recesses of the edges provided on the ridges 23 extend from the center of the tool for a distance smaller than the radius of the drill or lands 20 and have a diameter indicated by the letter N in Fig. 2. It is desired that the diameter N differs from the diameter of the drilled hole (which is equal to diameter M) by one-half of the depth of the full thread, in order to provide a so called three-quarter thread in the hole to be tapped. Since the hole drilled in the work W will have its diameter equal to N, not only during the drilling operation but also during the tapping operation, the drill lands 20 are in engagement with the walls of the drilled holes keeping the tool, including its tapping edges, in full and perfect concentricity with said hole and thus ensuring proper cutting of the thread without any eccentricity.

Figure 12:
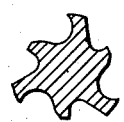
Fig. 12 is a sectional view illustrating a combined drill and tap of the general nature shown in Figs. 1-5, but having three drill lands and three threading edges, for more balanced operation.

In the embodiment of the invention illustrated in Figs. 1–4 there are provided two drill lands and two tapping edges. In cases where particularly precise work is required, I prefer to have the tool having a cross section such as shown in Fig. 12 wherein there are provided three drill lands and three tapping edges. Provision of three drill lands ensures a still more precise guiding of the tool, since three points locate a circle definitely and positively.

In addition to the guiding function, the provision of drill lands between the tapping edges, or vice versa, has an important advantage of cleaning the burrs produced by the tapping edge as soon as such burrs are formed, due to the fact that each drill land follows in operation immediately behind the respective tapping edge. It should be appreciated that formation of burrs due to cutting action of the tapping edge is particularly pronounced when such edge becomes dulled. Presence of burrs is greatly objectionable in precision work. Heretofore difficult and repeated deburring of tapped holes by use of cleaning taps and reamers used successively one after the other several times, has often been a part of usual shop procedure. Formation of burrs is particularly serious with steel and with soft metals. In some soft metals, such as aluminum, it is often necessary to use tap drill several sizes larger than the one prescribed, since the burrs produced in tapping decrease the hole so much that completing of the hole is often impossible without breakage of the tap.

In the use of my improved tool the above necessity is completely eliminated, and the burrs are removed as they are produced thereby assuring production of screw threads of perfect geometric configuration. Fig. 5 illustrates on an enlarged scale the above explained action of deburring of the thread by my improved tool with burrs produced by the tap being designated by the numeral 30. The broken line designated by the numeral 20 indicates the drill land following the tapping edge, which land cleans such burrs 30 as soon as they are produced. Moreover, the operation of changing from drill to tap either by changing the tool in the same machine or by moving the work to another machine, is eliminated together with the necessity of aligning either the work or the tool with respect to each other.

Figure 11:
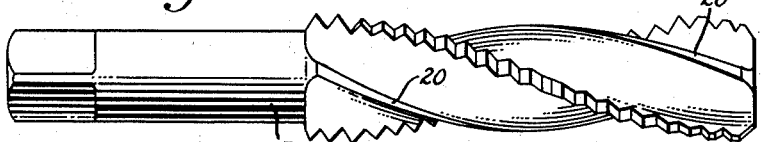
Fig. 11 is a side view of a tapping tool including deburring and guiding lands provided between its thread cutting edges.

Figs. 10 and 11 illustrate tools similar in part to the tool of Figs. 1–4, the difference being primarily in the form of the drill end. In the tool shown in Figs. 10 the drill end of the tool is in the form of so-called core drill and is designed for enlarging preformed or precast holes such as in castings. The core drill end of the tool of Fig. 10 has drilling edges 31 which do not come to a point but are terminated at a blunt end 32 of the tool. In other respects the tool of Fig. 10 is similar to that of Fig. 1, and its corresponding portions are designated by the same numerals.

Fig. 11 illustrates a tool having no drill end but constituting a tap having drill lands such as 30 performing the above explained guiding and deburring function. Such tool may be used after a hole of proper diameter is drilled, and it has advantages over conventional taps in producing a tapped hole of greater precision and free of any burrs.

It will be understood that more than three lands or more than three tapping edges may be provided on tools embodying my invention, if desired. Moreover, instead of having drill ends the tools may have reamer ends and be made to function as combined reamers and taps. Since the land on a reamer is very narrow, its guiding function may be thus decreased while its cutting or deburring function be increased. Such tools may be particularly advantageous where deburring of the thread may be more important than the guiding function.

From examination of the drawings and particularly of Figs. 2 and 3, it will be clearly seen that the thread recesses on my improved tool extend over the circumference of the drill lands. Therefore, such thread recesses cannot be formed by conventional methods due to interference of the drill lands. Moreover, the drill lands could not be ground by usual methods to have portions of true cylindrical surfaces, due to interference of the threading edge ridges 23.

In accordance with the present invention, I provide an improved method of making my improved tool. Figs. 6–9 illustrate important steps of said method. As illustrated in Fig. 6, the blank is first turned on a lathe or similar machine, with the extension 40 being provided in order to accommodate the second centering hole 17 for turning of the blank which hole could not be provided in a drill end. The portion of the blank from which the working portion of the tool is to be made is turned of two diameters, with portion 41 having a diameter corresponding to that of the outside diameter of the threading edges, and portion 42 having a diameter corresponding to the diameter of the drill lands, with certain allowances for subsequent machining operations being added to diameters of both of said portions.

Figure 7:
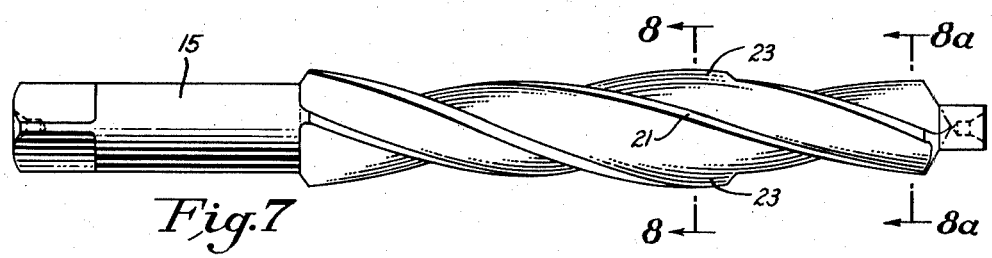
Fig. 7 is a view similar in part to Fig. 6 and showing the same blank after it has been fluted.
Figure 9:
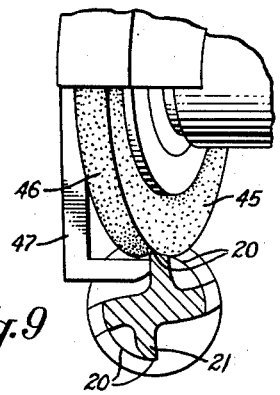
Fig. 9 illustrates the method of cylindrically grinding the drill lands of the tool to preserve their cylindrical configuration.
Figures 8, 8A:
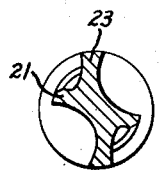
Fig. 8 is a sectional view taken in the direction of the arrows on the section plane passing through the line 8—8 of Fig. 7.
Fig. 8a is a sectional view taken in the direction of the arrows on the section plane passing through the line 8a—8a of Fig. 7.

Fig. 7 illustrates the blank after flutes have been provided thereon with the aid of suitable milling cutters. After the flutes are formed, the right-hand portions of the tapping edge ridges 23 are relieved within portion A, see Fig. 8a, to prevent them from extending beyond the lands 20. The drill land ridges 21 which at this stage have the same diameter with the portions A and B as the tapping edge ridges 23, are reduced in diameter by milling or other operations to their intended diameter. Thereupon, the blank may be hardened, and the drill lands 20 ground to their precise diameter with the aid of an apparatus illustrated in Fig. 9. As illustrated in Fig. 9, the apparatus includes a grinding wheel 45, having its working edge 46 grooved or recessed to correspond in the operative position of the wheel to the curvature desired on the drill lands 20. The wheel 45 is set at an angle with respect to the axis of the tool equal to the helical angle of the drill lands. The wheel 45 is moved longitudinally of the tool blank with said blank being rotated to have the helical twisted land 20 in constant engagement with the wheel 45. A locating finger 47 locates the tool with respect to the wheel 45.

In accordance with the invention the thread cutting edges may be ground on a hardened blank with the aid of a machine in which the grinding wheel is controlled by a cam in such a manner that the wheel jumps over the drill lands without touching them, and thus cut the thread on all the tapping edges without mutilating the drill lands 20 or affecting the cylindrical surfaces thereof. Desired rake angles and tap clearance are provided on the cutting edges in any suitable manner. The extension 40 may be cut off prior to grinding or be ground off and desired drill end be provided on the tool in a manner well known in the art. The threading edges are relieved within the portion B as shown in Fig. 1 for the purpose explained above.

By providing the tool and method of making the same disclosed above, the objects of the present invention listed above and numerous additional advantages are attained.

I claim:

1. A rotary axially fed cutting tool comprising a body and a shank, said body having a plurality of flutes forming between them an equal plurality of non-cutting drill lands extending throughout the entire length of said body and having their outer surfaces constitute portions of a cylindrical surface of a predetermined diameter determining the diameter of the hole to be drilled, a drill end on said body, said drill lands being of sufficient area to provide bearing surface to bear any practicably encountered side thrust on the tool and thus to prevent their cutting the sides of the drill hole as the result of such side thrust, an equal plurality of ridges provided in said flutes between said drill lands and extending outwardly for a predetermined distance beyond the cylindrical surfaces of said drill lands, thread cutting edges formed on said ridges to cut a cylindrical thread, the root diameter of said thread cutting edges being smaller than the diameter of the cylindrical surfaces of said drill lands by the amount to form flat crests of a predetermined magnitude on the internal threads of the workpiece and in order to provide sufficient bearing surface for the cylindrical portions of said drill lands and thus ensure the guiding function of said lands in the process of cutting the thread by said threading edges, and deburring of the flats of the threads by the action of said drill lands on said crests of the thread cut in the work, with said drill lands being thus adapted to be in constant and continuous contact with the walls of the hole through its entire length as well as with the flat crests of the thread through the entire threading operation and during the entire time of withdrawing the tool from the work.

2. The tool defined in claim 1 and having at least two helical drill lands and an equal number of helical thread cutting edges provided between said drill lands in the upper portion of the tool.

3. The tool defined in claim 1 and having at least three straight equidistantly spaced drill lands and an equal number of straight equidistantly spaced thread cutting edges provided between said drill lands in the upper portion of the tool.

References Cited in the file of this patent

UNITED STATES PATENTS

| Number | Name | Date |
|---|---|---|
| 93,824 | Humphreys | Aug. 17, 1869 |
| 1,447,700 | Wells | Mar. 6, 1923 |
| 1,475,561 | Bath et al. | Nov. 27, 1923 |
| 1,539,628 | Bayer | May 26, 1925 |
| 1,826,323 | Mueller | Oct. 6, 1931 |
| 1,875,362 | Wells | Sept. 6, 1932 |
| 2,110,618 | Baird | Mar. 8, 1938 |
| 2,510,830 | Nixon | June 6, 1950 |
| 2,735,116 | Mueller | Feb. 21, 1956 |